UNITED STATES PATENT OFFICE 2,386,484

ANHYDROUS HYDROGEN PEROXIDE AND METHOD OF MAKING SAME

Nathan I. Levitan, Buffalo, and Robert Kuoch, Tonawanda, N. Y., assignors to Buffalo Electro-Chemical Company, Inc., Tonawanda, N. Y.

No Drawing. Application October 25, 1944, Serial No. 560,364

5 Claims. (Cl. 252—136)

The present invention relates to anhydrous solutions of hydrogen peroxide and more particularly to solutions of hydrogen peroxide in alcohols.

Hydrogen peroxide has found particular value as a catalytic reagent in many polymerization reactions and also as an oxidizing agent for use in oxidizing and decolorizing certain types of organic compounds. The hydrogen peroxide of commerce is an aqueous solution and, in many instances, such aqueous solutions are not suitable for commercial purposes in which event recourse is had to the use of peroxides of organic acids or to peroxides of alcohols. In general, many of the organic peroxides are violently explosive or are difficult to prepare, or both.

Where attempts have been made heretofore to prepare solutions of hydrogen peroxide in organic solvents, such as the alcohols, only solutions of very low concentrations of active oxygen could be prepared and, in many instances, the solutions contained a considerable amount of water since the mixtures were made merely by adding aqueous peroxide to the alcohol except in those instances where 100% hydrogen peroxide was employed, a substance prepared only with the greatest difficulty and usually of unstable characteristics.

It is an object of the present invention to prepare nonaqueous solutions of hydrogen peroxide containing relatively large proportions of available active oxygen as contrasted with the relatively small proportion of available oxygen in the usual organic peroxide or in alcoholic solutions heretofore prepared.

In accordance with the present invention, anhydrous solutions of hydrogen peroxide in an alcohol may be prepared by the treatment of a boron ester of the alcohol with an aqueous solution of hydrogen peroxide. In general, that amount of hydrogen peroxide is employed to react with the ester of boric acid which contains sufficient water to hydrolyze the ester to boric acid. The reaction takes place between the ester and the peroxide solution in either alkaline neutral or acid solutions and generally at moderate to low temperatures.

Thus, the usual hydrogen peroxide of commerce can be used without special treatment to react upon the desired boron ester with the precipitation of relatively insoluble boric acid and the formation of the alcohol containing dissolved therein the hydrogen peroxide initially present in the reacting aqueous solution. The reaction takes place in accordance with the following equation:

where R is an alkyl radical and $n$ is the molar concentration of aqueous hydrogen peroxide in the quantity of aqueous hydrogen peroxide employed. It will be noted from the equation that simple hydrolysis of the ester occurs. In the absence of water, there is no reaction between hydrogen peroxide and the ester.

The amount of hydrogen peroxide in the alcohol produced by hydrolysis of the ester is dependent only on (1), the concentration of the hydrogen peroxide in the original aqueous peroxide solution and (2), the molecular weight of the ester. That is to say, the employment of reacting esters of lower molecular weight will produce a higher concentration of peroxide in the alcohol from a given concentration of aqueous peroxide solution. When the amount of hydrogen peroxide solution is chosen so that only the stoichiometric amount of water is added to the ester, all the water of the peroxide solution is used up in the hydrolytic reaction and an anhydrous solution is obtained. Should the amount of water in the aqueous peroxide solution be in excess of the stoichiometric amount, two layers are obtained in the reaction mixture after the boric acid is filtered off. There is thus formed an upper layer consisting of a solution of hydrogen peroxide in the alcohol and a lower layer consisting of a solution of hydrogen peroxide in water. The amounts of hydrogen peroxide in the two layers depends upon the distribution coefficient of hydrogen peroxide between the alcohol and water. If, on the other hand, the amount of water in the reacting hydrogen peroxide solution is less than the stoichiometric amount, the resultant solution comprises a single layer consisting of the alcohol having hydrogen peroxide and the excess boron ester dissolved therein. In the case of esters of the low molecular alcohol, such as methyl and ethyl alcohols, only one layer is obtained as these alcohols are miscible in all proportions with water.

In accordance with the present invention, therefore, the ester is reacted with sufficient aqueous hydrogen peroxide completely to hydrolyze the ester, in which event a substantially anhydrous solution of hydrogen peroxide in the alcohol is obtained. The higher the concentration of peroxide in the initial hydrogen peroxide solution, the higher will be the concentration of active oxygen contained in the resultant alcohol peroxide mixture. The resulting solutions are mixtures since the hydrogen peroxide can be extracted by water or usual hydrogen peroxide solvents, the extraction proceeding in accordance with the distribution coefficient by the extracting solvent and the alcohol.

The above method of preparation is suitable for preparation of hydrogen peroxide solutions in primary, secondary and tertiary alcohols and may be employed with substantially any alcohol from which a boron ester can be prepared.

The following examples are purely illustrative and are not given as limitative of the invention:

Example 1

To 91 grams of normal amyl borate were added 63 grams of 57% hydrogen peroxide aqueous solution and the mixture permitted to stand overnight at room temperature. A white crystalline precipitate of boric acid was filtered from the single layer of amyl alcohol-hydrogen peroxide solution. The yield of solution was 117 grams. The active oxygen in the solution was determined by the Kokatnur method and found to be 10.05 plus or minus 0.05%. The active oxygen content as determined by the molybdate method was found to be 10.1 plus or minus 0.05%. The method of Kokatnur, Jr., American Chemical Society 1432 (1941), is applicable to the determination of active oxygen in most non-aqueous peroxide compounds. The molybdate method consists of treating an aqueous acid solution of hydrogen peroxide with alkali iodide and a small amount of molybdate. The molybdate acts as a catalyst for the decomposition of hydrogen peroxide and iodine is liberated. This method is specific for hydrogen peroxide determination. These two methods of determination of active oxygen indicated that the solution consisted entirely of hydrogen peroxide and that no organic percompounds were present.

Substantially identical results were obtained using 91 grams isoamyl borate and 63 grams 57% hydrogen peroxide.

In contrast with the alcoholic solution containing 10.1% active oxygen as prepared above, when 1 mole (88 grams) of normal amyl alcohol and 63 grams of 57% hydrogen peroxide are mixed, two layers are obtained, a lower layer of 23 ml. consisting of aqueous hydrogen peroxide saturated with alcohol and an upper layer of amyl alcohol saturated with hydrogen peroxide solution. The upper layer contained only 6.2% active oxygen.

Example 2

38.4 grams of normal butyl borate were reacted with 31 grams of 57% hydrogen peroxide solution and permitted to stand overnight as in Example 1. After filtering off boric acid, 51 grams of solution were obtained of anhydrous hydrogen peroxide in normal butyl alcohol. This solution contained 14.1% active oxygen which represented a 30% hydrogen peroxide solution.

Example 3

The boron ester of benzyl alcohol is not reported in the literature. It is, however, possible to prepare this compound by reacting benzyl alcohol with boron anhydride at water bath temperature under reduced pressure.

60 g. of benzyl borate were treated with 20 ml. of 100 vol. (27% by weight) hydrogen peroxide. After filtering off the boric acid precipitate, a solution resulted which contained 3.2% active oxygen, or 6.8% in terms of hydrogen peroxide.

In contrast with the above, when 60 g. of benzyl alcohol were mixed with 20 ml. of 100 volume hydrogen peroxide, two layers resulted. The alcohol layer was separated and the amount of hydrogen peroxide therein determined and found to be 2.88%.

Anhydrous solutions of hydrogen peroxide in alcohols are stable at room temperatures, they are not explosive but burn with a smoky flame. Due to the relatively high concentration of active oxygen, contact with the skin should be avoided as they affect human tissue. Such solutions are suitable for employment as polymerization catalysts and as organic bleaching agents and germicides.

Although the preparation of peroxide solutions in amyl, butyl and benzyl alcohol have been illustrated, it is understood that the reaction is a general one and may be applied to the hydrolysis of any boron ester. In general, the esters of boric acid will be hydrolyzable at room temperatures although, with the higher esters, moderate heating may be resorted to provided the temperature be not so high as to decompose the hydrogen peroxide of the reacting solution. In general, the alcoholic solutions may be heated and maintained at relatively high temperatures for considerable periods of time without serious loss of active oxygen and without reaction between the dissolved alcohol and the peroxide.

What is claimed is:

1. The process of preparing alcoholic solutions of hydrogen peroxide which comprises reacting an ester of boric acid with sufficient aqueous hydrogen peroxide to hydrolyze said ester to boric acid.

2. The process of preparing alcoholic solutions of hydrogen peroxide which comprises reacting an ester of boric acid with sufficient aqueous hydrogen peroxide to hydrolyze said ester to boric acid and separating the precipitated boric acid.

3. The process of preparing a solution of hydrogen peroxide in amyl alcohol which comprises reacting amyl borate with sufficient aqueous hydrogen peroxide to hydrolyze the borate to boric acid.

4. The process of preparing a solution of hydrogen peroxide in butyl alcohol which comprises reacting butyl borate with sufficient aqueous hydrogen peroxide to hydrolyze the borate to boric acid.

5. The process of preparing a solution of hydrogen peroxide in isoamyl alcohol which comprises reacting isoamyl borate with sufficient aqueous hydrogen peroxide to hydrolyze the borate to boric acid.

NATHAN I. LEVITAN.
ROBERT KUOCH.